(12) United States Patent
Moroda

(10) Patent No.: US 12,549,846 B2
(45) Date of Patent: Feb. 10, 2026

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventor: Hajime Moroda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 18/493,965

(22) Filed: Oct. 25, 2023

(65) Prior Publication Data

US 2024/0155227 A1    May 9, 2024

(30) Foreign Application Priority Data

Nov. 7, 2022    (JP) .................................. 2022-178028

(51) Int. Cl.
    *H04N 23/63*    (2023.01)
    *H04N 23/65*    (2023.01)
    *H04N 23/661*   (2023.01)

(52) U.S. Cl.
    CPC ........... *H04N 23/634* (2023.01); *H04N 23/65* (2023.01); *H04N 23/661* (2023.01)

(58) Field of Classification Search
    CPC .... H04N 23/63; H04N 23/633; H04N 23/634; H04N 23/65; H04N 23/651; H04N 23/66; H04N 23/661; H04N 23/662; H04N 7/186; G06F 1/3212; G06F 1/3215; G08B 5/228; G08B 5/36; G08B 5/38; G08B 13/19682; G08B 13/19691; G08B 13/19697
    See application file for complete search history.

(56) References Cited

U.S. PATENT DOCUMENTS

| 7,209,187 B2 | 4/2007 | Mears et al. |
| 2014/0267894 A1* | 9/2014 | Campbell .............. H04N 23/55 348/374 |
| 2016/0071319 A1 | 3/2016 | Fallon |
| 2018/0204385 A1 | 7/2018 | Sarangdhar |
| 2021/0076080 A1* | 3/2021 | Yoo .................... H04N 21/4854 |
| 2021/0342047 A1 | 11/2021 | Badr |

FOREIGN PATENT DOCUMENTS

| JP | 2002-354363 A | 12/2002 |
| JP | 2003-319214 A | 11/2003 |

OTHER PUBLICATIONS

Extended European Search Report issued on Apr. 18, 2024 in counterpart European Patent Appln. No. 23205803.2.
Jul. 25, 2025 Communication Pursuant to Article 94(3) EPC in European Patent Application No. 23 205 803.2.

* cited by examiner

*Primary Examiner* — Daniel M Pasiewicz
(74) *Attorney, Agent, or Firm* — Venable LLP

(57) ABSTRACT

An information processing device includes a communication unit configured to communicate with an external device and a display control unit configured to display a state of the external device with a captured image. When a notification command indicating that an indicator of the external device is turned on or blinking is received from the external device via the communication unit, the display control unit displays information on the state of the external device based on the notification command with the image and transmits a control command for turning off the indicator to the external device via the communication unit.

9 Claims, 7 Drawing Sheets

INFORMATION PROCESSING DEVICE, INFORMATION PROCESSING METHOD, AND STORAGE MEDIUM

BACKGROUND OF THE INVENTION

Field of the Invention

The present invention relates to an information processing device, an information processing method, and a storage medium associated with control of an indicator.

Description of the Related Art

In the related art, an information processing device that can perform monitoring of a video or acquisition of vocal sound by remotely controlling an ex ternal device via a network or the like is known. The information processing device can access the external device and acquire information or control the external device. In general, the external device includes a light emitting diode (LED) as an indicator, and a state of the external device is represented by turning-on or blinking of the indicator.

In Japanese Unexamined Patent Application Publication No. 2003-319214, a battery-driven imaging device that notifies of a residual battery capacity using an LED and decreases power consumption in the LED as the residual battery capacity decreases is disclosed.

In Japanese Unexamined Patent Application Publication No. 2002-354363, a system including a user interface that selectively turns on illumination of a power indicator when a video device is powered on is disclosed.

In some external devices, the indicator may be turned on or made to blink to notify of occurrence of state change. In this case, a large amount of electric power of the corresponding external device may be consumed due to turning-on or blinking of the indicator.

SUMMARY OF THE INVENTION

According to an aspect of the present invention, there is provided an information processing device comprising at least one processor or circuit configured to function as: a communication unit configured to communicate with an external device; and a display control unit configured to display a state of the external device with a captured image, wherein, when a notification command indicating that an indicator of the external device is turned on or blinking is received from the external device via the communication unit, the display control unit displays information on the state of the external device based on the notification command with the image and transmits a control command for turning off the indicator to the external device via the communication unit.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
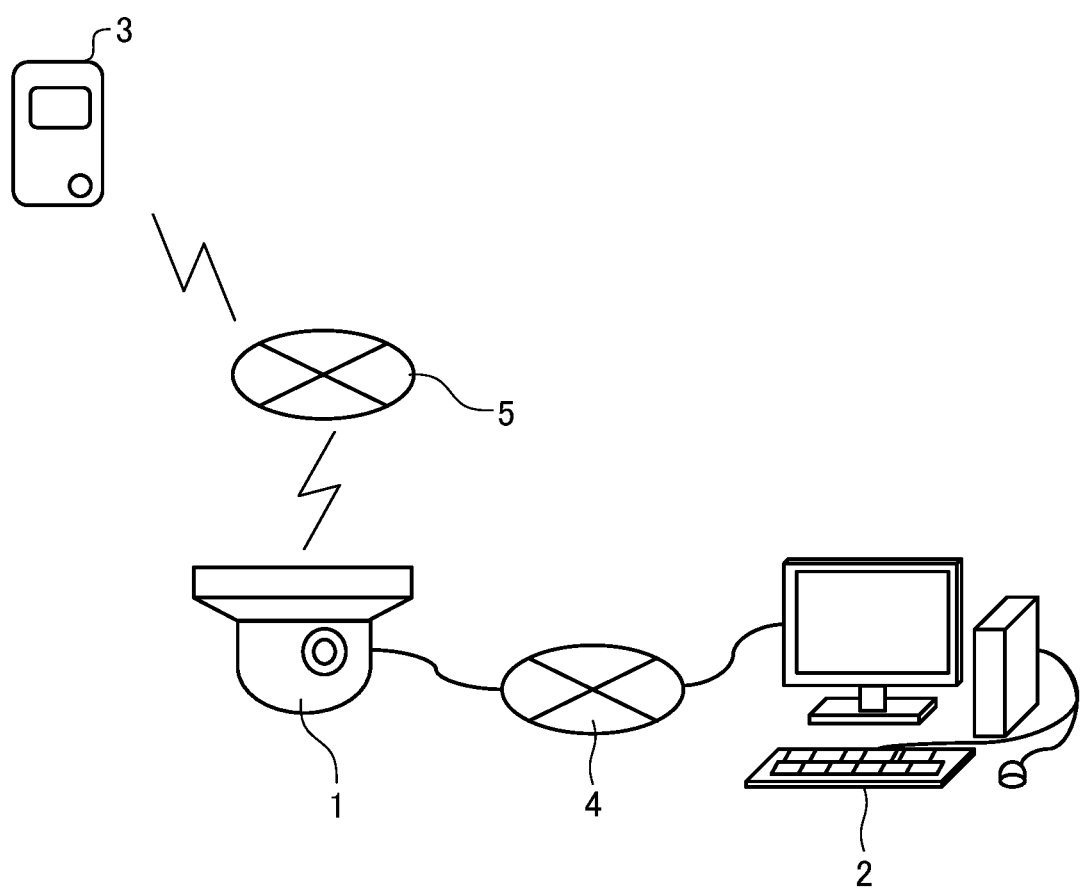
FIG. 1 is a diagram illustrating an example of a configuration of a monitoring system according to a first embodiment.

FIG. 1 is a diagram illustrating an example of a configuration of a monitoring system according to a first embodiment. The monitoring system according to the present embodiment includes an information processing device 1, a client device 2, an external device 3, a network 4, and a network 5.

The information processing device 1 is a device having a function of monitoring a state of the external device 3. For example, a network camera can be used as the information processing device 1. The information processing device 1 communicates with the client device 2 and the external device 3 via the networks 4 and 5.

The client device 2 controls an operation of the information processing device 1. For example, an information processing device such as a personal computer (PC) can be used as the client device 2. The client device 2 includes a display unit and serves as a display control device that controls the display unit. The client device 2 transmits various control commands to the information processing device 1.

The control commands include, for example, commands for performing acquisition or control of a state of turning-on or blinking of an indicator of the external device, control of the information processing device 1, and the like. The information processing device 1 transmits a response to a received control command to the client device 2.

The external device 3 communicates with the information processing device 1 via the network 5. The information processing device 1 transmits a control command to the external device 3 or the external device 3 transmits a notification command associated with a device state to the information processing device 1. The external device 3 transmits and receives a command for turning-on or blinking of the indicator to and from the information processing device 1.

The information processing device 1 and the client device 2 are communicatively connected to each other via the network 4. The network 4 is constituted, for example, by a plurality of routers, switches, cables, and the like satisfying a communication standard such as Ethernet (registered trademark). The network is not particularly limited in communication standard, scale, and configuration as long as it can enable communication between the information processing device 1 and the client device 2.

The information processing device 1 and the external device 3 are communicatively connected to each other via a wireless or wired network 5. The network 5 can employ, for example, a network based on a communication standard such as Z-Wave, Zigbee (registered trademark), or a wireless LAN. The network is not particularly limited in communication standard, scale, and configuration as long as it can enable communication between the information processing device 1 and the external device 3.

The external device 3 includes an indicator such as an LED. The indicator is turned on or made to blink when the state of the information processing device 1 changes. For example, when an error occurs in the external device 3 or sensing/detection of a moving object or the like occurs, the indicator is turned on or blinks. In the present embodiment, the indicator is turned, but the indicator may blink.

In the present embodiment, the external device 3 is of a battery-driven type and consumes a residual battery capacity with continuous turning-on of the indicator. When the communication standard of the network 5 is Z-Wave, an indicator report command is used as a command for notifying of information on turning-on of the indicator.

When the information processing device 1 transmits an indicator get command to the external device 3, an indicator report command is transmitted as a response thereto from the external device 3 to the information processing device 1. The indicator report command may be spontaneously transmitted from the external device 3 to the information processing device 1 when turning-on of the indicator occurs.

On the other hand, an indicator set command is used as a command for controlling the turning-on state of the indicator. The indicator report command or the indicator set command includes fields such as indicator ID indicating a type of an indicator, property ID indicating a turning-on method of the indicator, and value indicating a current value of property ID.

One or more property IDs are provided for one indicator ID. In an indicator ID, for example, 0x04 is defined as, for example, an ID number indicating occurrence of an error or 0x0C is defined as an ID number indicating occurrence of sensing/detection.

In a property ID, for example, 0x01 is defined as an ID number indicating a turning-on level or, for example, 0x02 is defined as an ID number indicating a turning-on/off state (indicating turning-off when the value is 0x00 and turning-on when the value ranges from 0x01 to 0xFF). In the property ID, for example, 0x07 is defined as an ID number indicating turning off after how many seconds.

When a state change corresponding to an indicator ID occurs, the external device 3 turns on the indicator and notifies the information processing device 1 of information on the turning-on using the indicator ID, the property ID, or the value constituting the fields in the indicator report command.

The information processing device 1 can control turning-on of the indicator by transmitting the indicator set command in which the indicator ID or the property ID of a control target and the value thereof are designated to the external device 3.

Figure 2:
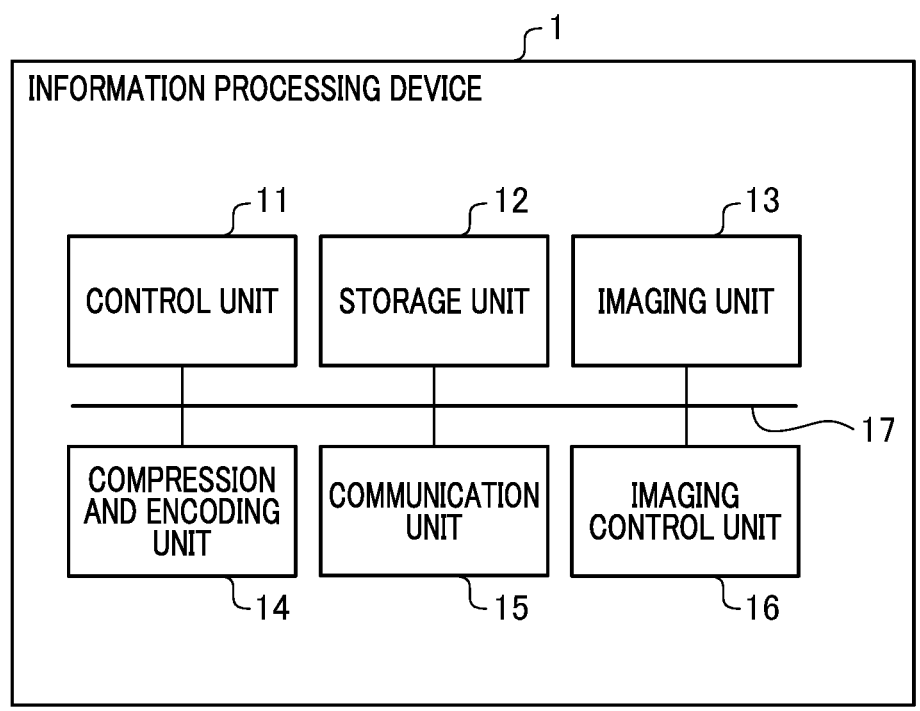
FIG. 2 is a functional block diagram illustrating an example of a configuration of an information processing device 1 according to the first embodiment.

The configuration of the information processing device 1 will be described below. FIG. 2 is a functional block diagram illustrating an example of the configuration of the information processing device 1 according to the first embodiment. Some of the functional blocks illustrated in FIG. 2 are realized by causing a CPU which is a computer which is not illustrated included in the control unit 11 to execute a computer program stored in a memory which is a storage medium which is not illustrated. The functional blocks illustrated in FIG. 2 may not be incorporated into the same housing or may be realized by different devices connected via signal lines.

The information processing device 1 includes a control unit 11, a storage unit 12, an imaging unit 13, a compression and encoding unit 14, a communication unit 15, and an imaging control unit 16. The constituent units of the information processing device 1 are connected to each other via a bus 17. The control unit 11 controls the information processing device 1 as a whole. The control unit 11 includes, for example, a central processing unit (CPU) as a computer.

The storage unit 12 stores various types of data. The storage unit 12 stores a program storage area in which a computer program executed by the control unit 11 is mainly stored, a work area used while a program is being executed, management information of external devices, and information on a turning-on state of an indicator of each external device. The storage unit 12 stores various types of data such as information indicating whether or not commands have been transmitted/received to and from the external device, command information set for the external device, and a storage area of image data generated by the imaging unit 13 or the control unit 11.

When an external device is added as a management target, the information processing device 1 acquires various types of information of the external device such as supported command information or battery driving information and stores the acquired information in the storage unit 12.

The imaging unit 13 converts analog signals obtained by capturing a subject image formed by an imaging optical system of the information processing device 1 using an imaging device to digital data, performs necessary image processing thereon, and sequentially stores the resultant data as a captured image in the storage unit 12. The control unit 11 receives an image acquisition event from the imaging unit 13 when a captured image is stored in the storage unit 12.

The compression and encoding unit 14 generates image data by performing a compression and encoding process based on Joint Photographic Experts group (JPEG), H.264, or the like on a captured image generated by the imaging unit 13 or a superimposed image and stores the generated image data in the storage unit 12.

The communication unit 15 performs a communication step of communicating with an external device. The communication unit 15 receives, for example, a notification command from the external device 3 and transmits a response to the notification command as a control command to the external device. The control unit 11 receives a command reception event from the communication unit 15 when a command is received from the external device 3 via the communication unit 15.

The communication unit 15 transmits the control command generated by the control unit 11 to the external device 3. The communication unit 15 sequentially reads the image data compressed and encoded by the compression and encoding unit 14 from the storage unit 12 and transmits the read image data as a video stream to the client device 2.

The imaging control unit 16 drives a drive unit of the imaging unit 13 in a panning driving manner, a tilt driving manner, a zoom driving manner, or a rotation manner to change a viewing angle of the imaging unit 13 or the like based on values of panning, tilting, rotation, zooming, or focusing instructed by the control unit 11. Alternatively, the imaging control unit 16 performs focusing driving or the like.

The imaging unit 13 may be configured not to include a mechanical driving unit. Without using a driving unit, the imaging unit 13 may perform panning, tilting, rotation, zooming, focusing, and the like in an electronic manner by cutting an image.

Figure 3:
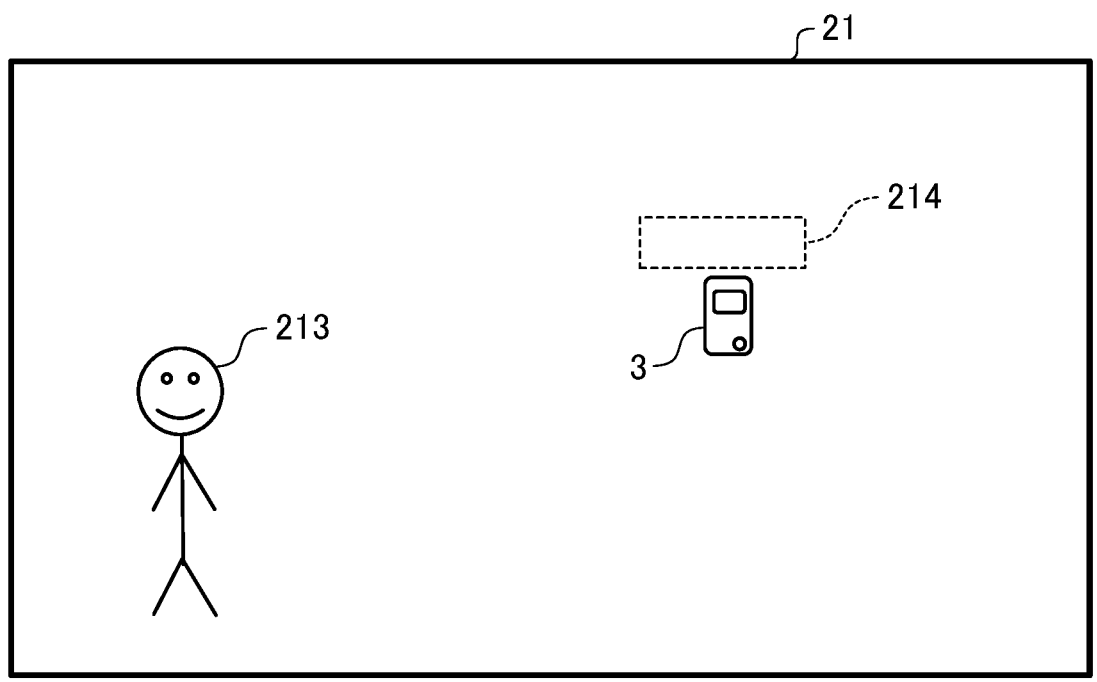
FIG. 3 is a diagram illustrating an example of a display screen of superimposed display settings according to the first embodiment.

FIG. 3 is a diagram illustrating an example of a display screen for superimposing settings according to the first embodiment and illustrates an example of a display screen 21 for setting a superimposing setting range for superimposing information on turning-on of the indicator of the external device 3. The display screen 21 is displayed by causing a CPU of the client device 2 to execute a computer program stored in the storage unit of the client device 2 based on an instruction to perform superimposing setting in the client device 2.

On the display screen 21, the external device 3, an addition button 211 for adding new superimposing, a deletion button 212 for deleting the superimposing, a subject 213, and a superimposing setting range 214 in which information of the external device 3 is displayed are displayed.

A user adds an external device 3 to the display screen 21 in advance. Then, the user sets superimposing for displaying information of the external device 3 on the display screen 21. When the addition button 211 is pushed, a display range such as the superimposing setting range 214 is displayed. By designating a device number of the external device to be displayed in the superimposing setting range, information acquired from the external device 3 is displayed.

Alternatively, an icon image such as an LED for indicating that the indicator is turned on may be superimposed in the superimposing setting range 214. That is, the superimposing includes superimposing an icon indicating turning-on or blinking of the indicator. In order to easily identify a position of the external device 3, text associated with a name, a position, or a message of the external device 3 may be displayed in the superimposing setting range 214.

Then, in the client device 2, the superimposing setting range 214 is dragged and dropped and disposed in the vicinity of the corresponding external device 3 on the display screen 21 using an input device such as a mouse. The settings of the superimposing setting range are stored in the storage unit 12 form the communication unit of the client device 2 via the communication unit 15 of the information processing device 1.

The control unit 11 generates an image in which information is superimposed on the captured image on the basis of the stored information of the superimposing setting range and stores the generated image as a superimposed image in the storage unit 12. In this way, the control unit 11 serves as a display control unit configured to perform a display control step of superimposing a state of an external device on a captured image. The superimposing setting range to be deleted can be deleted by selecting the superimposing setting range and pushing the deletion button 212.

Figure 4:
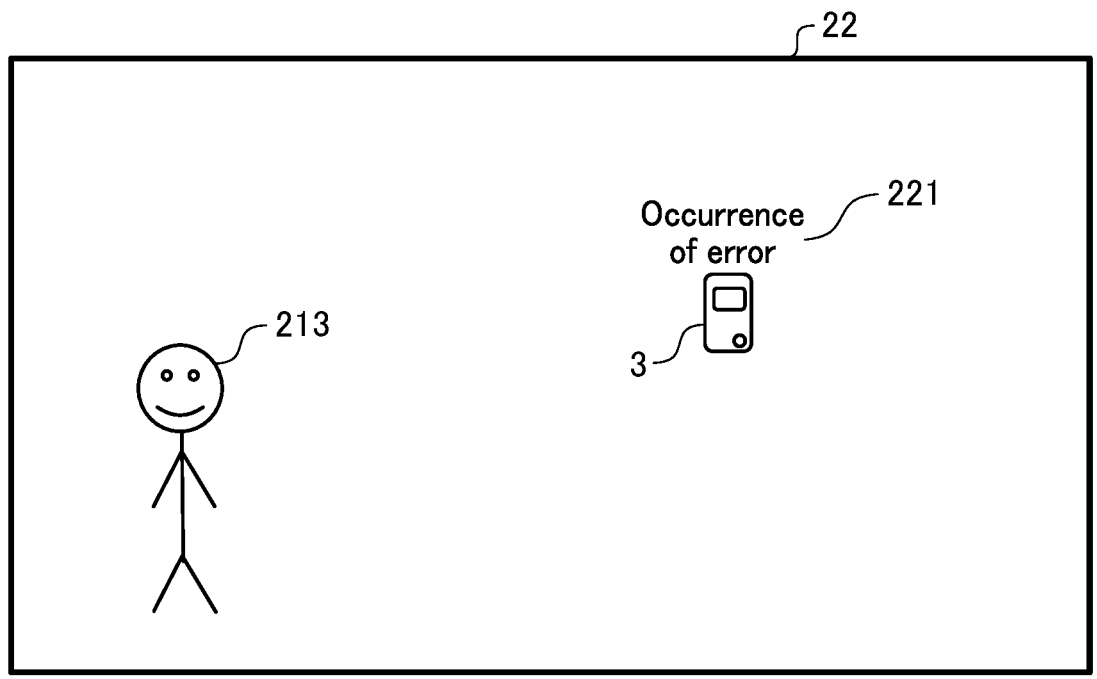
FIG. 4 is a diagram illustrating an example of a display screen of a viewer according to the first embodiment.

FIG. 4 is a diagram illustrating an example of a display screen of a viewer according to the first embodiment and illustrates an example of a display screen 22 which is a viewer screen on which a superimposed image is displayed. The display screen 22 is displayed by causing the CPU of the client device 2 to execute a computer program stored in the storage unit of the client device 2 on the basis of an instruction to display a viewer screen in the client device 2.

On the display screen 22, an external device 3, a subject 213, and a superimposing display 221 corresponding to the external device 3 set on the display screen 21 are displayed. Here, "occurrence of error" which is text indicating occurrence of an error in the superimposing display 221 when an error occurs in the external device 3 and an indicator is turned on is displayed.

A processing example of the information processing device 1 of displaying information on a state of the external device 3 on the display screen 22 and turning off the indicator of the external device 3 when an error occurs in the external device 3 and the indicator is turned on will be described below with reference to the flowchart of FIG. 5.

Figure 5:
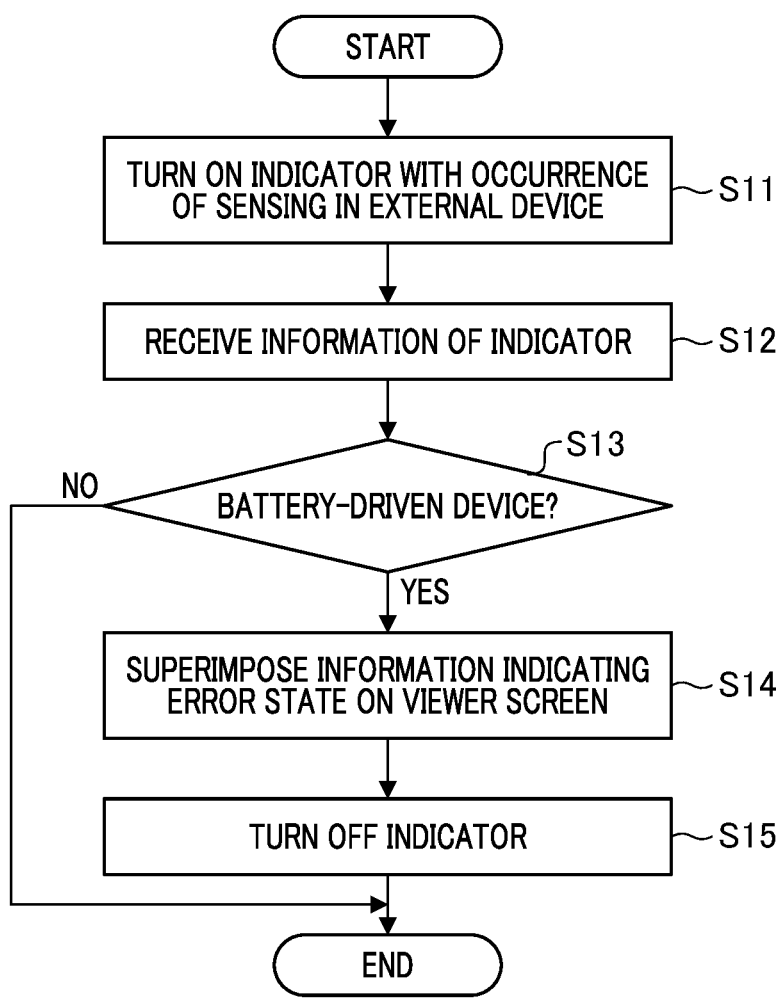
FIG. 5 is a flowchart illustrating an example of a routine which is performed by the information processing device according to the first embodiment.

FIG. 5 is a flowchart illustrating an example of a routine which is performed by the information processing device according to the first embodiment. Operations of steps in the flowchart illustrated in FIG. 5 are performed by causing the CPU as a computer in the control unit 11 to execute a computer program stored in the memory thereof.

In Step S11, a certain change in state occurs in the external device 3, and the control unit of the external device 3 turns on the indicator therewith. In this flowchart, it is assumed that a certain error occurs in the external device 3 and thus the indicator is turned on. The change in state is not particularly limited as long as it serves as a trigger for turning-on of the indicator.

In Step S12, the communication unit 15 receives a command associated with turning-on of the indicator from the external device 3 via the network 5 and stores the received command in the storage unit 12. When the network 5 is, for example, Z-Wave, the communication unit 15 receives the indicator report command.

The external device 3 may spontaneously transmit the indicator report command, or the communication unit 15 may be configured to periodically receive the indicator report command by transmitting the indicator get command at intervals of a predetermined time.

When the value with an ID number of 0x01 indicating a turn-on level of the indicator in the property ID in the indicator report is equal to or greater than 0x01 or the value with an ID number of 0x02 indicating a turn-off state of the indicator is equal to or greater than 0x01, the control unit 11 determines that the indicator has been turned on.

In Step S13, the control unit 11 ascertains information of the external device 3 stored in the storage unit 12 and determines whether the external device is a battery-driven device. When the network 5 is, for example, Z-Wave, the control unit 11 determines whether the external device 3 is a battery-driven device from information of a role type stored at the time of inclusion of the external device 3.

Alternatively, when a wake up command class is supported on the basis of information of a command supported by the external device 3 and stored at the time of inclusion, the control unit 11 may determine that the external device 3 is a battery-driven device. The routine proceeds to Step S14 when the external device 3 is determined to be a battery-driven device, and the routine of the flowchart illustrated in FIG. 5 ends otherwise.

In Step S14, the control unit 11 displays information on turning-on of the indicator of the target external device with the captured image, for example, by superimposing. Specifically, the control unit 11 generates a superimposed image on which information on the change in state (for example, occurrence of an error) causing turning-on of the indicator of the target external device such as the superimposed display 221 is superimposed.

That is, Step S14 serves as a display control step of superimposing information on the state of the external device based on a notification command on an image when the notification command indicating that the indicator of the external device is turned on or made to blink is received from the external device.

The control unit 11 ascertains the value of the indicator ID as information on the change in state causing turning-on of the indicator in the field of the indicator report command acquired from the external device 3. Then, text corresponding to the ID is compared with a table stored in advance in the storage unit 12 and is used as information to be superimposed.

For example, when 0x04 which is an indicator ID indicating occurrence of an error is received, the control unit 11 acquires text indicating occurrence of an error corresponding to 0x04 from the table and generates a superimposed image. A video stream based on the generated superimposed image is delivered to the client device 2 via the communication unit 15, and a viewer screen such as the display screen 22 is displayed on the client device 2.

In Step S15, the control unit 11 immediately transmits a control command for turning off the turned-on indicator to the external device 3 via the communication unit 15 when superimposed display is started in Step S14. The control unit 11 may transmit the control command when a predetermined time (for example, several seconds to several tens of seconds) has elapsed after the superimposed display has been started. After the superimposed display has been started in Step S14, the superimposed display is performed continuously, for example, for a predetermined time of several tens of seconds to several minutes.

Here, Step S15 serves as a display control step of transmitting a control command for turning off the indicator to the external device 3 through the communication step.

In the display control step, when a notification command has been received and the external device has been determined to be a battery-driven device, information on the state of the external device based on the notification command is superimposed on an image, and the control command is transmitted to the external device.

Specifically, the control unit 11 transmits an indicator set command in which the value of a property ID associated with turning-on/off out of property IDs in the turned-on indicator ID is set to 0x00 to the external device 3.

For example, when the value of the property ID 0x02 indicating a turn-on/off state is 0x01 with respect to 0x04 which is an indicator ID indicating occurrence of an error, the control unit 11 transmits an indicator set command in which the value of the property ID 0x02 is set to 0x00.

In order to turn off the indicator after a predetermined time elapses, the control unit 11 may transmit, for example, a command which is set to turn off the indicator after the predetermined time elapses. For example, 0x0A, 0x06, 0x07, and 0x08 which are the property IDs indicate that the indicator is turned off after a time corresponding to the set value has elapsed (of which the units are hour, minute, second, and 1/100 second, respectively).

Accordingly, by transmitting the indicator set command in which the value of one property ID is set to be equal to or greater than 0x01, the indicator may be turned off after the predetermined time elapses. Instead of deleting the superimposed display when a predetermined time has elapsed after the superimposed display has been started in Step S14, the control unit 11 may delete the superimposed display on the viewer screen when information on the change in state causing turning-on of the indicator is received and the control unit 11 ascertains that the change in state has ended.

According to the present embodiment, when a change in state occurs in an external device 3 and thus an indicator thereof is turned on, the information processing device 1 uses superimposed display settings indicating a state of the target external device.

Then, the information processing device 1 transmits a superimposed image in which information on the change in state of the target external device is displayed at the superimposed display position to the client device 2 to display the superimposed image.

Then, the information processing device 1 transmits a command to turn off the indicator to the external device 3. Accordingly, it is possible to notify a monitor of the change in state of the external device and to curb consumption of electric power due to continuous turning-on of the indicator.

Second Embodiment

An example in which an error occurs in an external device 3 has been described in the first embodiment, but an example in which sensing with a timeout time occurs in an external device 3 will be described in a second embodiment. In the present embodiment, the external device 3 is a sensing device and is, for example, a moving object sensor that senses a moving object passing in front. The external device is not particularly limited as long as it is an external device causing sensing.

Figure 6:
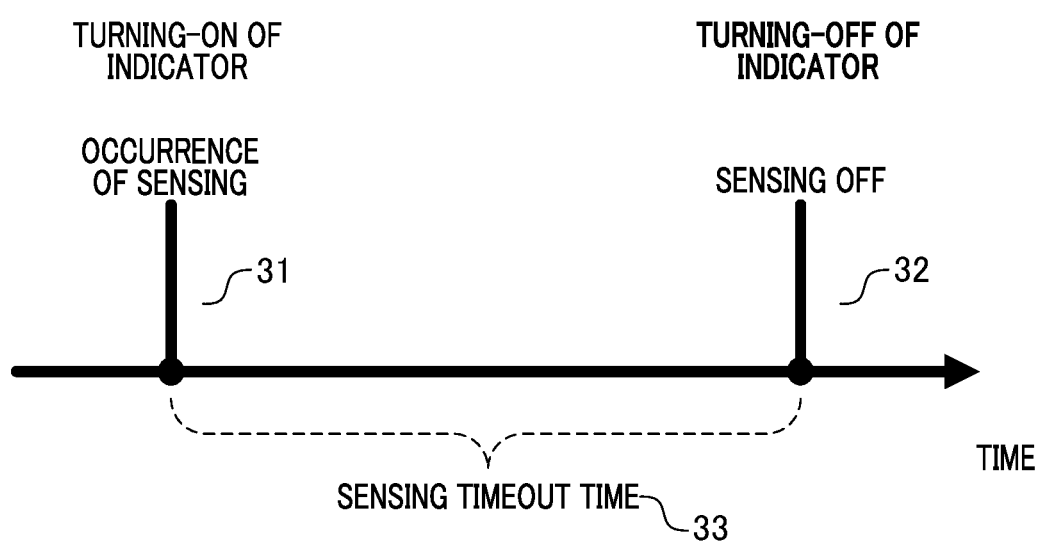
FIG. 6 is a diagram illustrating an example of occurrence of sensing and a timeout time in an external device 3 according to a second embodiment.

FIG. 6 is a diagram illustrating an example of occurrence of sensing and a timeout time in an external device 3 according to the second embodiment. A timing 31 is a timing at which a sensing/detection output is generated in the external device 3 and an indicator is turned on therewith. A timing 32 is a timing at which a state in which the sensing/detection output is transmitted from the external device 3 is released and the indicator is turned off therewith.

A sensing timeout time 33 is a period of time from a time point at which transmission of the sensing/detection output from the external device 3 has been started to a time point at which transmission of the sensing output is released. The sensing timeout time 33 is predetermined in setting of the external device 3. When the external device 3 supports Z-Wave, the sensing timeout time is changed by setting the value of a parameter associated with the sensing timeout time using a configuration set command.

The information processing device 1 can ascertain setting of the current sensing timeout time from the value of the parameter by receiving a configuration report command from the external device 3. Here, since turning-on of the indicator is maintained longer as the sensing timeout time becomes longer, a residual battery capacity may be consumed more, for example, when the sensing timeout time is set to be longer than a default set value.

An example in which information on a state of the external device 3 is displayed on the display screen 22 when a sensing output is generated in the external device 3, the indicator is turned on, and the sensing timeout time is longer than a predetermined time will be described with reference to the flowchart illustrated in FIG. 7. The flowchart in FIG. 7 includes a process of turning off the indicator of the external device 3.

Figure 7:
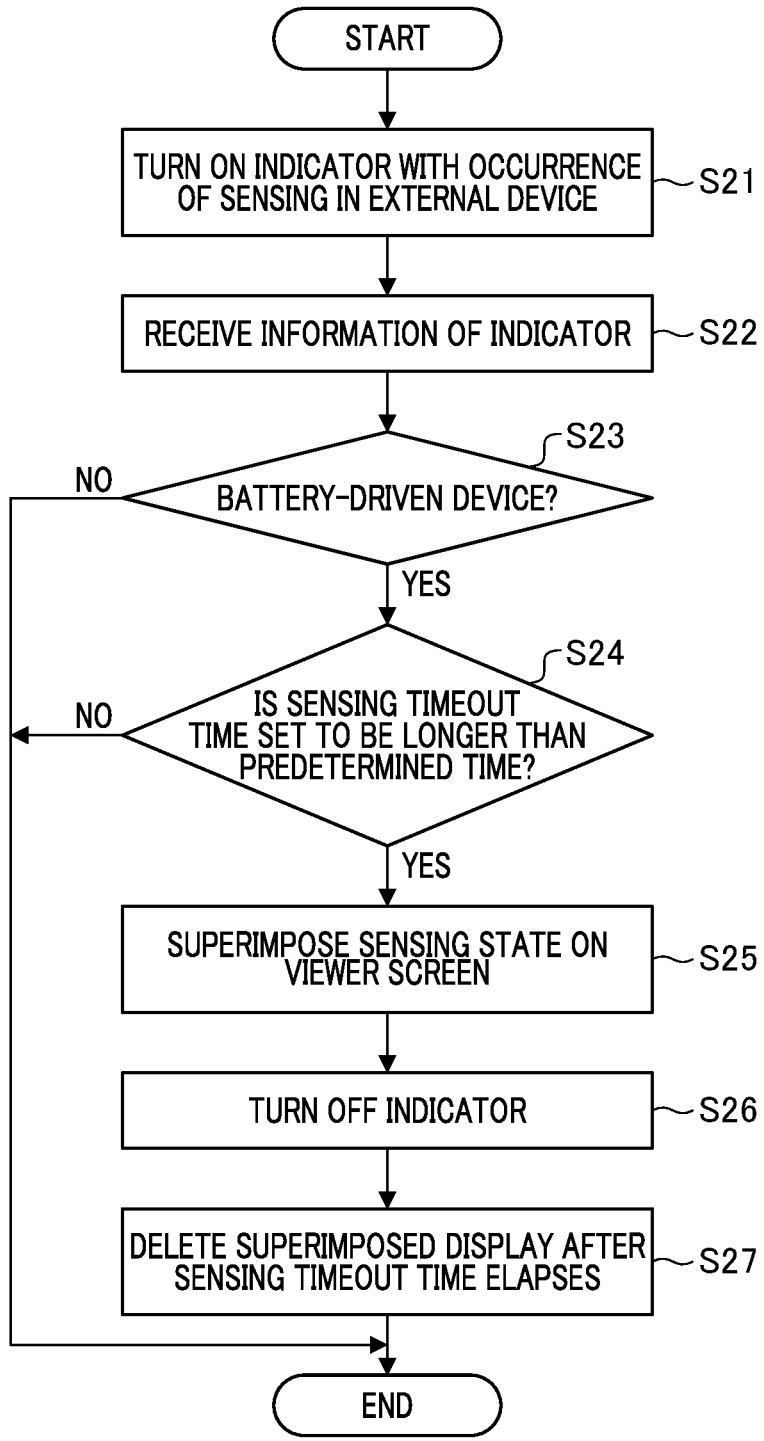
FIG. 7 is a flowchart illustrating an example of a routine which is performed by the information processing device according to the second embodiment.

FIG. 7 is a flowchart illustrating an example of a routine which is performed by the information processing device according to the second embodiment. The operations of steps of the flowchart illustrated in FIG. 7 are performed by causing a CPU which is a computer in the control unit 11 to execute a computer program stored in a memory.

In Step S21, the control unit of the external device 3 turns on an indicator with generation of a certain sensing/detection output in the external device 3. The type of sensing is not particularly limited as long as it serves as a trigger for turning-on of the indicator and it uses a sensing timeout time. The processes of Steps S22 to S23 are the same as the processes of Steps S12 to S13 in the flowchart illustrated in FIG. 5 and thus description thereof will be omitted.

In Step S24, the control unit 11 acquires settings of a sensing timeout time of the external device 3 stored in the storage unit 12 and determines whether the sensing timeout time is longer than a predetermined time. When the network 5 is Z-Wave, for example, the sensing timeout time of the external device 3 can be set to a value of a parameter associated with the sensing timeout time of the configuration set command.

Accordingly, the control unit 11 compares the sensing timeout time with a default value of the parameter stored in the storage unit 12 at the time of starting of connection to the external device 3. When a longer timeout time is set in the configuration set command, the control unit 11 determines that the sensing timeout time is longer than a predetermined sensing timeout time. The control unit 11 may determine that the sensing timeout time is longer than the predetermined sensing timeout time when it is longer than a predetermined time.

For example, the control unit 11 receives a configuration report command by transmitting a configuration get command. Then, the control unit 11 acquires the sensing timeout time from a parameter associated with the sensing timeout time therein and determines that the sensing timeout time is longer than the predetermined sensing timeout time, for example, when the acquired sensing timeout time is equal to or greater than a predetermined value (for example, equal to or greater than 10 seconds). The routine proceeds to Step S25 when it is determined that the sensing timeout time is longer than the predetermined time, and the routine of the flowchart illustrated in FIG. 7 ends otherwise.

In Step S25, the same superimposed display process as in Step S14 is performed. However, in the present embodiment, for example, text indicating that sensing has occurred (for example, "~has been sensed") is superimposed with respect to 0x0C which is an indicator ID indicating occurrence of sensing. In this way, the superimposed display includes superimposition of text information on the state of the external device.

In Step S26, the same indicator turning-off process as in Step S15 is performed. In the present embodiment, for example, turning-off the indicator is performed with respect to 0x0C which is the indicator ID indicating occurrence of sensing.

In Step S27, the control unit 11 deletes the superimposed display performed in Step S26 after the sensing timeout time acquired in Step S24 elapses. Specifically, the control unit 11 acquires the value of the parameter associated with the sensing timeout time set in a configuration set or acquired using a configuration report command from the storage unit 12.

Then, at a timing at which the sensing timeout time elapses after the superimposed display has been started in Step S25, the control unit 11 deletes the superimposed display from the generated image. When the sensing timeout time is not set or is infinite, the process of Step S27 is not performed.

In the present embodiment, when the indicator is not turned off after a predetermined time has elapsed, the control unit 11 performs the superimposed display and transmits a control command for turning off the indicator to the external device.

According to the present embodiment, the information processing device 1 uses superimposed display settings indicating a state of a target external device when sensing occurs in the external device 3, the indicator is turned off, and the sensing timeout time of the external device is longer than a predetermined time. Then, the client device 2 displays a superimposed image in which information on a change in state of the target external device is displayed at the superimposed display position.

On the other hand, a command for turning off the indicator is transmitted to the external device 3. Accordingly, it is possible to notify a monitor of a change in state of the external device without consuming electric power due to continuous turning-on of the indicator.

Other Embodiments

While exemplary embodiments of the present invention have been described above in detail, the present invention is not limited to such specific embodiments and can be modified or the like within the scope of the present invention, and the first embodiment and the second embodiment may be appropriately combined.

For example, only when information on turning-on of the indicator is received and a value for turning off the turned-on indicator after a predetermined time elapses is not set, superimposition of information on the viewer screen and turning-off of the indicator may be performed.

Specifically, when information on turning-on of the indicator is an indicator report command, it is determined whether 0x0A, 0x06, 0x07, and 0x08 are not present in the property IDs associated with whether the indicator is to be turned off after the predetermined time elapses. Alternatively, in this case, it is determined whether all the values of the property IDs are 0x00 In this case, superimposition of information on the viewer screen and turning-off of the indicator can be performed.

Only when the residual battery capacity of the external device 3 is small, superimposition of information on the viewer screen and turning-off of the indicator may be performed. Specifically, when a command for the residual battery capacity of the external device 3 is received via the communication unit 15 and it is determined that the residual battery capacity is small, the control unit 11 performs superimposition of information on the viewer screen and turning-off of the indicator. That is, when the residual battery capacity of the external device is equal to or less than a predetermined value, the superimposed display may be performed, and a control command for turning off the indicator may be transmitted to the external device.

Regarding the residual battery capacity, for example, when a command for the residual battery capacity is a battery report command and the value of bit 0 or bit 1 of a replace/recharge status is 0x01, it is determined that the residual battery capacity is small.

After the superimposed display indicating the state of the indicator has been performed, a process of deleting the superimposed display may be performed subsequently to Step S15 in the flowchart of FIG. 5 according to the first embodiment. Alternatively, the process may be performed when the sensing timeout time is infinite or is not set in Step S27 in the flowchart of FIG. 7 according to the second embodiment.

Specifically, for example, a button for deleting a superimposed display may be added to the display screen 22 and a user may be able to delete the superimposed display by manually pushing the button when the user has noticed turning-on of the indicator. Other methods such as deleting the superimposed display at a timing at which it is determined that a predetermined time has elapsed after the superimposed display, communication with the external device 3 has been cut off, or the change in state serving as a trigger for turning-on the indicator has ended may be employed.

In the first embodiment or the second embodiment, the external device 3 may not be a battery-driven device. In this case, the process of Step S13 in the flowchart of FIG. 5 or the process of Step S23 in the flowchart of FIG. 7 is not performed and the routine proceeds to Step S14 or S24.

Some or all of the functional units of the monitoring system may be mounted as hardware in the information processing device 1, the client device 2, and the external device 3.

At least a part of the configuration of the information processing device 1 may be realized by hardware. When at least a part of the configuration is realized by hardware, a dedicated circuit can be automatically generated on a field programmable gate array (FPGA) by a program for realizing the steps, for example, using a predetermined compiler.

At least a part of the configuration may be realized by hardware by forming a gate array circuit in the same way as the FPGA. It may be realized by an application-specific integrated circuit (ASIC). The configurations, processes, and the like in the aforementioned embodiments can be applied to a computer or various devices other than the information processing device 1, the client device 2, and the external device 3.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing device through a network or various storage media. Then, a computer (or a CPU, an MPU, or the like) of the information processing device may be configured to read and execute the program. In such a case, the program and the storage medium storing the program configure the present invention.

The present invention may be realized, for example, using at least one processor or circuit configured to function of the embodiments explained above. The present invention may be realized by distributed processes using two or more processors.

This application claims the benefit of Japanese Patent Application No. 2022-178028, filed on Nov. 7, 2022, which is hereby incorporated by reference herein in its entirety.

What is claimed is:

1. An information processing device comprising at least one processor or circuit executing instructions that, when executed by the at least one processor or circuit, cause the information processing device to:
   receive first information sent from an external device with which the information processing device is capable of communicating, the first information indicating that an indicator of the external device is turned on or blinking;
   cause a display unit to display an image, captured by an imaging unit, on which second information related to a state of (i) the external device or (ii) the indicator is superimposed, depending on the first information; and
   transmit to the external device a control command causing the indicator to be turned off, depending on the first information.

2. The information processing device according to claim 1, wherein, in a case where (i) the first information is received and (ii) the external device is a battery-driven device, the display unit is caused to display the captured image on which the second information is superimposed, and the control command is transmitted to the external device.

3. The information processing device according to claim 1, wherein, in a case where (i) the first information is received, (ii) the external device is a battery-driven device, and (iii) a residual battery capacity of the external device is equal to or less than a predetermined value, the display unit is caused to display the captured image on which the second information is superimposed, and the control command is transmitted to the external device.

4. The information processing device according to claim 1, wherein, in a case where the indicator is not turned off after a predetermined time has elapsed, the display unit is caused to display the captured image on which the second information is superimposed, and the control command is transmitted to the external device.

5. The information processing device according to claim 1, wherein the control command causes the indicator to be turned off after a predetermined time has elapsed.

6. The information processing device according to claim 1, wherein the second information comprises a text related to the state of the external device.

7. The information processing device according to claim 1, wherein the second information comprises an icon indicating that the indicator is turned on or blinking.

8. An information processing method comprising:
   receiving first information, sent from an external device, indicating that an indicator of the external device is turned on or blinking;
   causing a display unit to display an image, captured by an imaging unit, on which second information related to a state of (i) the external device or (ii) the indicator is superimposed, depending on the first information; and
   transmitting, to the external device, a control command causing the indicator to be turned off, depending on the first information.

9. A non-transitory computer-readable storage medium configured to store a computer program comprising instructions for executing a method of:
   receiving first information, sent from an external device, indicating that an indicator of the external device is turned on or blinking;
   causing a display unit to display an image, captured by an imaging unit, on which second information related to a state of (i) the external device or (ii) the indicator is superimposed, depending on the first information; and
   transmitting, to the external device, a control command causing the indicator to be turned off, depending on the first information.

* * * * *